(12) United States Patent
Wepfer

(10) Patent No.: US 9,091,429 B2
(45) Date of Patent: Jul. 28, 2015

(54) NUCLEAR STEAM GENERATOR STEAM NOZZLE FLOW RESTRICTOR

(75) Inventor: Robert M. Wepfer, Export, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 933 days.

(21) Appl. No.: 13/197,010

(22) Filed: Aug. 3, 2011

(65) Prior Publication Data

US 2013/0032100 A1 Feb. 7, 2013

(51) Int. Cl.

| F22B 37/02 | (2006.01) |
|---|---|
| F16K 15/00 | (2006.01) |
| F22B 1/02 | (2006.01) |
| F22B 37/00 | (2006.01) |
| F16K 17/30 | (2006.01) |

(52) U.S. Cl.
CPC ............... *F22B 1/025* (2013.01); *F16K 17/30* (2013.01); *F22B 37/002* (2013.01)

(58) Field of Classification Search
CPC ...... F22B 37/002; F22B 37/26; F22B 37/268; F22B 1/025; F16K 15/00; F16K 15/02; F16K 15/025; F16K 21/02
USPC ........ 122/4 R; 137/517, 516.11, 543, 516.19, 137/497
See application file for complete search history.

(56) References Cited

U.S. PATENT DOCUMENTS

| 501,437 A * | 7/1893 | Pierce .......................... 137/513.3 |
|---|---|---|
| 3,674,214 A | 7/1972 | Brown |
| 3,794,077 A * | 2/1974 | Fanshier .................... 137/513.3 |
| 4,057,077 A | 11/1977 | Schabert et al. |
| 4,753,773 A * | 6/1988 | Garabedian et al. .......... 376/299 |
| 4,932,435 A * | 6/1990 | Stroze et al. ................... 137/504 |
| 5,329,886 A * | 7/1994 | Sylvester et al. ............... 122/32 |
| 5,351,891 A | 10/1994 | Hansen et al. |
| 5,357,891 A * | 10/1994 | Kobayashi et al. .......... 114/242 |
| 5,609,047 A * | 3/1997 | Hellman et al. ................ 68/222 |
| 6,513,724 B1 | 2/2003 | Joseph et al. |
| 2002/0101355 A1* | 8/2002 | Young .......................... 340/606 |

(Continued)

FOREIGN PATENT DOCUMENTS

| DE | 419026 | 9/1925 |
|---|---|---|
| FR | 451255 | 4/1913 |
| GB | 1513775 | 7/1978 |

OTHER PUBLICATIONS

International Preliminary Report on Patentability for PCT/US2012/046340 dated Feb. 4, 2014 (Forms PCT/IB/373, PCT/ISA/237).

(Continued)

*Primary Examiner* — Gregory Huson
*Assistant Examiner* — Nathaniel Herzfeld
(74) *Attorney, Agent, or Firm* — Richard J. Coldren; Westinghouse Electric Company LLC

(57) ABSTRACT

A steam nozzle flow restrictor for a steam generator that restricts steam exit flow during a steam line break, but has a low pressure drop during normal operation. The flow restrictor has a support web suspended from the steam outlet nozzle with the web having a central opening concentric with the central axis of the nozzle. A shaft is slidably supported within the central opening of the web and has an orifice plate that is suspended within the steam generator at one end of the shaft, spaced from the steam nozzle. The orifice plate closes against the underside of the nozzle upon encountering increased steam exit flow as a result of a steam line break.

10 Claims, 5 Drawing Sheets

(56) References Cited

U.S. PATENT DOCUMENTS

| | | |
|---|---|---|
| 2002/0179739 A1 | 12/2002 | Kunkle et al. |
| 2003/0047145 A1* | 3/2003 | Hyp .............................. 122/499 |
| 2006/0000427 A1 | 1/2006 | Kraus et al. |
| 2007/0277885 A1* | 12/2007 | Goble ........................... 137/517 |
| 2008/0083463 A1* | 4/2008 | Fazekas et al. ............. 137/512.1 |
| 2008/0121194 A1* | 5/2008 | Prabhu et al. ................... 122/34 |
| 2011/0284104 A1* | 11/2011 | Riano Gutierrez ........... 137/517 |

OTHER PUBLICATIONS

Supplementary European Search Report dated Mar. 13, 2015 for EP12820123.3.

* cited by examiner

NUCLEAR STEAM GENERATOR STEAM NOZZLE FLOW RESTRICTOR

BACKGROUND

1. Field

This invention relates generally to steam generators and more particularly to a flow restrictor for a steam outlet nozzle of a steam generator.

2. Description of Related Art

A pressurized water nuclear reactor steam generator typically comprises a vertically oriented shell, a plurality of U-shaped tubes disposed in the shell so as to form a tube bundle, a tube sheet for supporting the tubes at the ends opposite the U-like curvature, a divider plate that cooperates with the tube sheet and a channel head forming a primary fluid inlet header at one end of the tube bundle and a primary fluid outlet header at the other end of the tube bundle. A primary fluid inlet nozzle is in fluid communication with the primary fluid inlet header and a primary fluid outlet nozzle is in fluid communication with a primary fluid outlet header. The steam generator secondary side comprises a wrapper disposed between the tube bundle and the shell to form an annular chamber made up of the shell on the outside and the wrapper on the inside and a feedwater ring disposed above the U-like curvature end of the tube bundle.

The primary fluid having been heated by circulation through the reactor enters the steam generator through the primary fluid inlet nozzle. From the primary fluid inlet nozzle the primary fluid is conducted through the primary fluid inlet header, through the U-tube bundle, out the primary fluid outlet header and through the primary fluid outlet nozzle to the remainder of the reactor coolant system. At the same time, feedwater is introduced into the steam generator secondary side, i.e., the side of the generator interfacing with the outside of the tube bundle above the tube sheet, through a feedwater nozzle which is connected to a feedwater ring inside the steam generator. In one embodiment, upon entering the steam generator, the feedwater mixes with water returning from moisture separators. This mixture called the downcomer flow, is conducted down the annular chamber adjacent the shell until the tube sheet located at the bottom of the annular chamber causes the water to change direction passing in heat transfer relationship with the outside of the U-tubes and up through the inside of the wrapper. While the water is circulating in heat transfer relationship with the tube bundle, heat is transferred from the primary fluid in the tubes to water surrounding the tubes causing a portion of the water surrounding the tubes to be converted to steam. The steam then rises and is conducted through a number of moisture separators that separate entrained water from the steam, and the steam vapor then exits the steam generator through a steam exit nozzle and is typically circulated through a turbine to generate electricity in a manner well known in the art.

Nuclear steam generators typically have flow limiters in the steam exit nozzles to limit the amount of steam that will be exhausted into the containment in the unlikely event of a steam line break. While the flow limiters are an important safety feature they add a penalty that can detract from the efficiency of the generators. The full power pressure drop in the steam nozzle flow limiter of some steam generators can be nearly 20 psi. A pressure drop reduction to 5 psi or less in the steam nozzle flow limiter can have a significant benefit to the outlet steam pressure, and thus favorably increase plant efficiency and revenues. In addition, a reduction in the pressure drop reduces moisture carryover by up to 0.05 percent, which benefits turbine longevity.

Accordingly, a new flow limiter design is desired that will have a significantly lower pressure drop without sacrificing performance.

Further, such a new steam nozzle flow limiter design is desired that will have significantly lower moisture carryover.

SUMMARY

These and other objects are achieved by the steam generator described hereafter having a steam outlet with an interior wall defining a steam outlet conduit with a central axis. A support web is suspended from the steam outlet conduit and has a central opening concentric with the central axis. A shaft is slidably supported and axially movable within the central opening and has a stop at one end that prevents the one end from slipping into the opening and an orifice plate at another end. The orifice plate extends perpendicular to the central axis and is spaced from the steam outlet conduit when the stop at the one end rests against the central opening. When the shaft moves to an extent of its travel in a direction to move the stop away from the support web central opening, the orifice plate rests against an input end of the steam conduit. The orifice plate is in a closed position when the shaft moves to the extent of its travel and the orifice plate has one or more openings that restrict flow of steam through the steam outlet conduit as compared to the opening available to the steam outlet conduit when the shaft is in an open position with the stop resting against the central opening. A biasing mechanism maintains the shaft in an open position during normal steam generator operation, but its force is overcome by the increase flow of steam experienced upon a steam line break.

Preferably, the openings in the orifice plate are a plurality of holes that are symmetrically formed about the axis. Desirably, the openings are formed from two concentric series of holes that are evenly spaced around the axis.

In one embodiment, the steam outlet conduit has an inlet with a contour and the orifice plate has a complimentary contour. In another embodiment the axis extends in the vertical direction and the biasing mechanism is gravity. Alternatively, the axis need not extend in a vertical direction and the biasing mechanism is a spring supported between the support web and the orifice plate. Desirably, the spring is a helical spring wound on the shaft.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
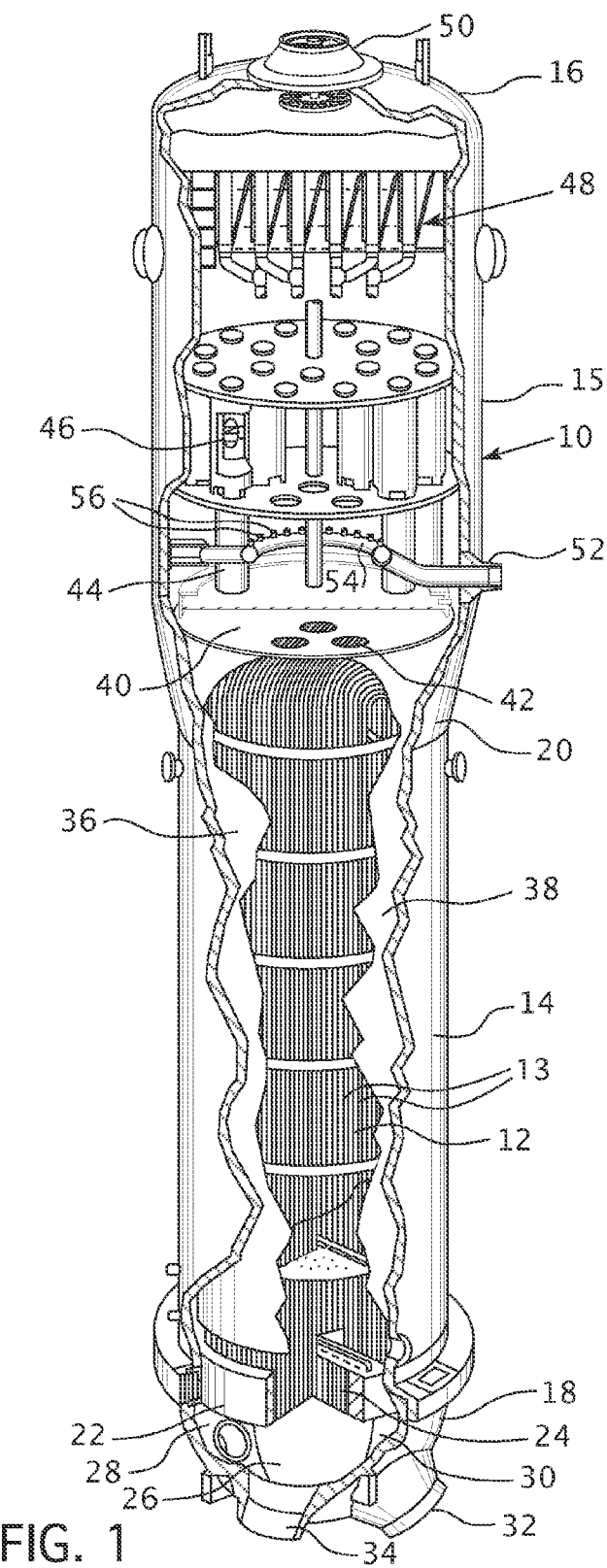
FIG. 1 is a perspective view, partially cut away, of a vertical tube and shell steam generator.

Referring now to the drawings, FIG. 1 shows a steam or vapor generator 10 that utilizes a plurality of U-shaped tubes which form a tube bundle 12 to provide the heating surface required to transfer heat from a primary fluid to vaporize or boil a secondary fluid. The steam generator 10 comprises a vessel having a vertically oriented tubular shell portion 14 and a top enclosure or dished head 16 enclosing the upper end and a generally hemispherical shaped channel head 18 enclosing the lower end. The lower shell portion 14 is smaller in diameter than the upper shell portion 15 and a frustoconical shaped transition 20 connects the upper and lower portions. A tube sheet 22 is attached to the channel head 18 and has a plurality of holes 24 disposed therein to receive ends of the U-shaped tubes 13. A divider plate 26 is centrally disposed within the channel head 18 to divide the channel head into two compartments 28 and 30, which serve as headers for the tube bundle 12. Compartment 30 is the primary fluid inlet compartment and has a primary fluid inlet nozzle 32 in fluid communication therewith. Compartment 28 is the primary fluid outlet compartment and has a primary fluid outlet nozzle 34 in fluid communication therewith. Thus, primary fluid, i.e., the reactor coolant which enters fluid compartment 30 is caused to flow through the tube bundle 12 and out through outlet nozzle 34.

The tube bundle 12 is encircled by a wrapper 36 which forms an annular passage 38 between the wrapper 36 and the shell and cone portions 14 and 20, respectively. The top of the wrapper 36 is covered by a lower deck plate 40 which includes a plurality of openings 42 in fluid communication with a plurality of larger tubes 44. Swirl vanes 46 are disposed within the larger tubes 44 to cause steam flowing therethrough to spin and centrifugally remove some of the moisture contained within the steam as it flows through this primary centrifugal separator. The water separated from the steam in this primary separator is returned to the top surface of the lower deck plate 40. After flowing through the centrifugal separator, the steam passes through a secondary separator 48 before reaching a steam outlet nozzle 50 centrally disposed in the dished head 16.

The feedwater inlet structure of this generator includes a feedwater inlet nozzle 52 having a generally horizontal portion called a feedring 54 and a plurality of discharge nozzles 56 elevated above the feedring. Feedwater, which is supplied through the feedwater inlet nozzle 52, passes through the feedwater ring 54 and exits through discharge nozzles 56 and, in one prior art embodiment, mixes with water which was separated from the steam and is being recirculated. The mixture then flows down from above the lower deck plate 40 into the annular, downcomer passage 38. The water then enters the tube bundle 12 at the lower portion of the wrapper 36 and flows among and up the tube bundle where it is heated to generate steam. The moisture laden steam then passes through the openings 42 in the lower deck plate, to and through the riser tubes 44 and vanes 46 which form the primary separators, and to and through the secondary separators 48 to the steam outlet nozzle 50. From the steam outlet nozzle the dried steam vapor is typically conveyed to a turbine/generator for the production of electricity. The steam exiting the turbine is condensed and recycled back to the feedwater inlet nozzle in a closed cycle to continuously remove heat from the reactor primary coolant loop. The continuous removal of heat from the reactor core in this fashion assists in controlling the temperature of the core.

A large break in the steam line between the steam outlet nozzle 50 and the turbine can actually affect the ability of the tube bundle 12 to transfer heat from the primary coolant. Therefore, in the unlikely event of such a break, it is desirable to restrict the amount of steam that can escape from the closed cycle secondary loop. For this purpose, a steam nozzle flow restrictor is employed as part of or in place of the steam outlet nozzle 50. In its preferred form, the steam nozzle flow restrictor should provide little, if any, resistance to steam flow during normal steam generator operation while impeding the loss of steam from the steam generator in the unlikely event of a major steam line break.

Figure 2:
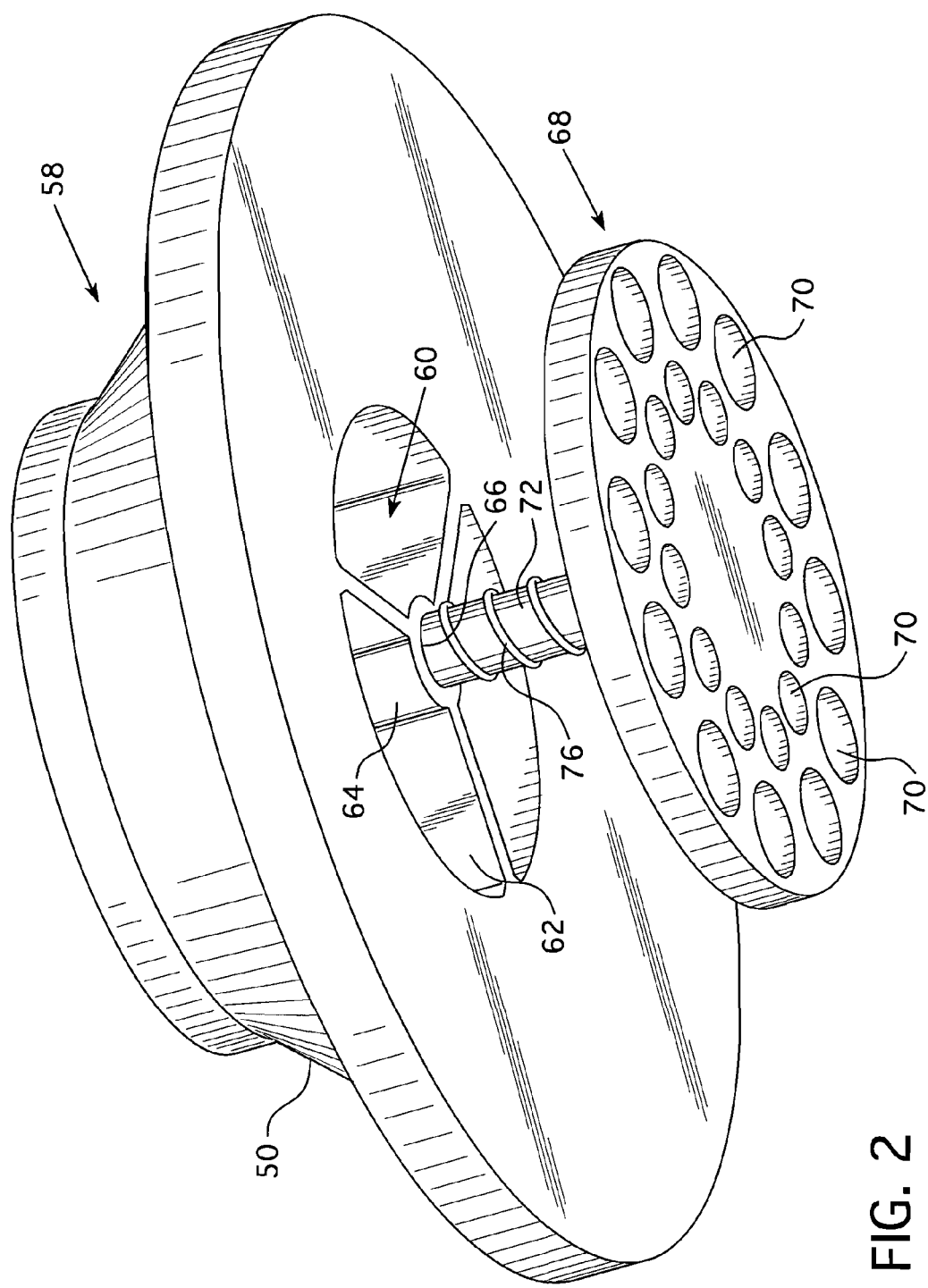
FIG. 2 is a perspective view taken from the underside of the flow restrictor of the embodiment described hereafter with the orifice plate in an open position.
Figure 3:
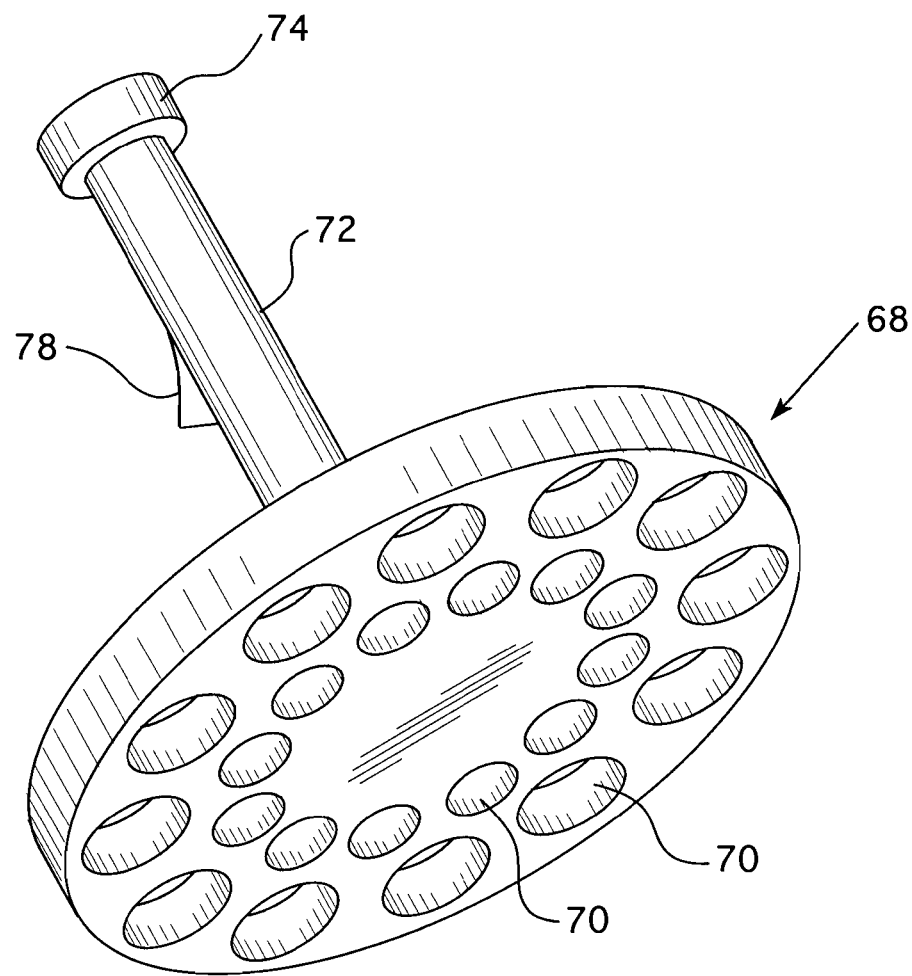
FIG. 3 is a perspective view of the moveable elements of the flow restrictor described herein taken from the underside of the orifice plate.
Figure 4:
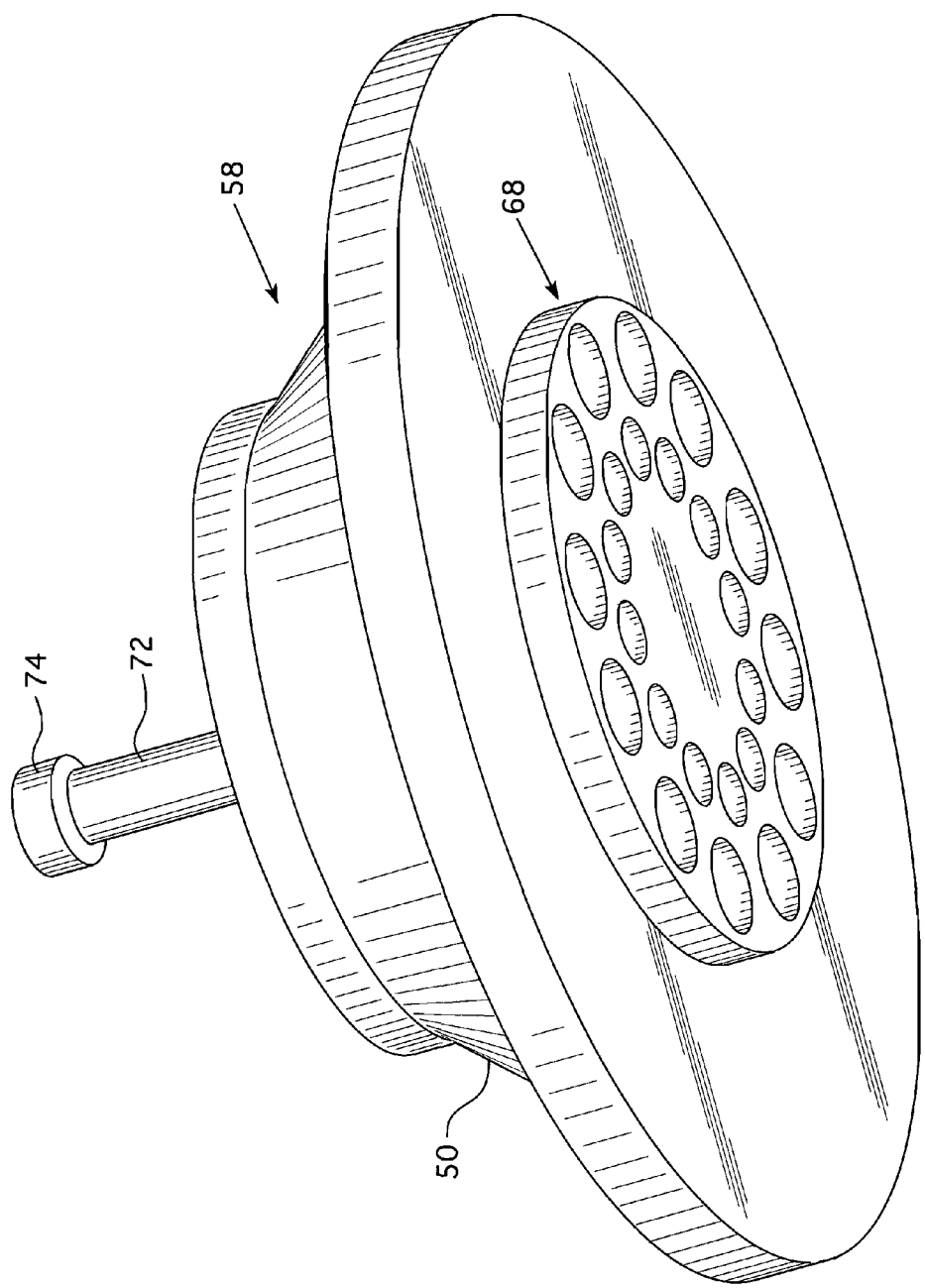
FIG. 4 is a perspective view of the flow restrictor described hereafter taken from the underside with the orifice plate in a closed position.
Figure 5:
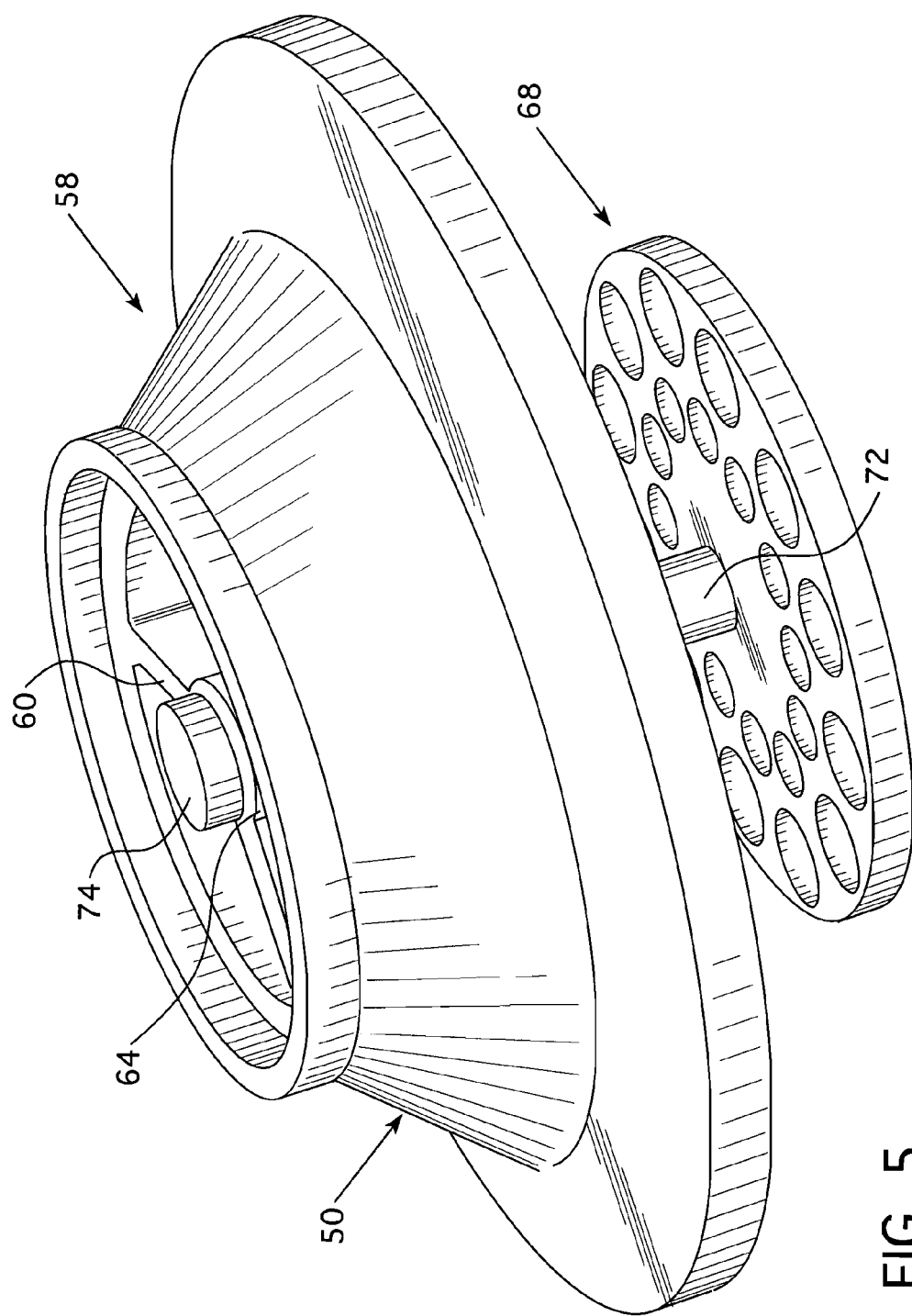
FIG. 5 is an isometric view of the flow restrictor described hereafter with the orifice plate in an open position.

Such a steam nozzle flow restrictor for a nuclear steam generator constructed in accordance with a preferred embodiment described herein is illustrated in FIGS. 2-5. FIG. 2 provides a perspective view of the steam nozzle flow restrictor 58 taken from the underside from which the several moveable components of the flow restrictor can be best observed. The steam nozzle flow restrictor 58 includes a supporting web 60 having three or more radial arms 62 that extend from the interior walls of the steam outlet nozzle 50 or in an insert within the nozzle. The web's radial arms are equal distantly spaced around the interior walls of the nozzle and have a central hub 64 with an axially extending through hole 66. The flow restrictor assembly 58 further includes a flow restrictor orifice plate 68 that has a number of axially extending through holes 70. The through holes 70 are arranged in concentric circles with the holes in each circle having approximately the same diameter and the holes in the interior circle having a smaller diameter than the holes in the exterior circle. Though two such circles are shown, it should be appreciated that the number of holes and the number of circles will depend on the volume of steam that the restrictor will be designed to release to avoid over pressurization of the generator. The orifice plate 68 has a centrally disposed, axially extending shaft 72 that is affixed to an upper side of the orifice plate. The shaft 72 extends axially through the hole 66 in the central hub 64 and is capped at its distal end with a radially extending land that forms a stop 74, seen in FIG. 3, that prevents the shaft from dropping through the web's central hole 66. FIG. 4 shows the flow restrictor of FIG. 2 with the orifice plate and shaft in a closed position while FIG. 5 shows an isometric front view of the flow restrictor shown in FIGS. 2-4 with the orifice plate in the open position.

During a steam line break, the additional lifting force caused by rapid steam flow causes the flow restrictor orifice plate assembly, comprising the flow restrictor orifice plate 68, the shaft 72 and the stop 74, to move upward, thereby causing the orifice plate 68 to seat against the underside of the supporting web 60. The relocation of the flow restricting orifice plate 68 to the high velocity zone at the underside of the web 60 limits steam flow during peak break conditions and enhances safe shutdown of the reactor. In the closed position shown in FIG. 4, the outer periphery of orifice plate holes 70 are substantially sealed off by the underside of the steam outlet nozzle 50 allowing a limited flow through the smaller series of holes 70 in the inner circle on the orifice plate 68, which limits the pressure buildup within the generator to within design limits.

FIG. 2 shows the flow restrictor assembly 58 during normal operation. The central rod shaft 72 supports the flow restrictor orifice plate 68 from the web 60 and allows generally unrestricted flow into the steam outlet nozzle 50. FIG. 5 is a top view of the flow restrictor assembly 58, showing the stop block 74 connected to the central shaft 72 and resting on the hub 64 with the flow restrictor orifice plate 68 in the down (unactuated) position.

FIG. 4 illustrates the flow restrictor 58 after actuation by a steam line break. During a steam line break, the increased flow through the steam outlet nozzle 50 results in a lifting force on the lower face of the restrictor orifice plate 68, overcoming the assembly dead weight, such that the flow restrictor plate is pressed against the web 60 or the nozzle 50.

The central shaft 72 slides through the hole 66 in the web 60, guiding the flow restrictor orifice plate 68 to the flow restricted position.

A number of optional features may be included to meet different functional criteria. For example, the biasing mechanism for biasing the shaft 72 in the open position may comprise a helical spring 76 wound around the shaft 72 between the orifice plate 68 and the web central hub 64. This alternative will enable the flow restrictor assembly 58 to be employed in the horizontal position. Additionally, a latching element, such as the leaf spring 78, that is cantilevered from the shaft 72 (FIG. 3), can be employed to latch the flow restrictor assembly 58 in the closed position once it is actuated. Other possible alternatives include legs which extend out from the orifice plate in a radial direction to prevent lateral motion of the lower end of the restrictor assembly; gusseting of the flow restrictor orifice plate to the central shaft; use of a bolted attachment between the central shaft and the orifice plate; and different configurations of the orifice plate attachment, such as the use of multiple plates.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A steam generator comprising:
   a steam outlet nozzle having an interior wall defining a steam outlet conduit having a central axis and an inlet end facing an interior of the steam generator;
   a support web suspended from the steam outlet conduit and having a central opening concentric with the central axis;
   a shaft slidably supported and axially moveable within the central opening and having a stop at one end that prevents the one end from slipping into the opening and an orifice plate at another end extending substantially perpendicular to the central axis and overlapping the inlet end of the steam outlet conduit with a periphery of the orifice plate extending under an upper surface of the interior of the steam generator, the orifice plate being spaced from the steam outlet conduit when the stop at the one end rests against the central opening and the orifice plate at the another end resting against an input end of the steam outlet conduit when the shaft moves to an extent of its travel in a direction to move the stop away from the support web central opening, the orifice plate being in a closed position when the shaft moves to the extent of its travel and having one or more openings blocked by the upper surface of the interior of the steam generator that restricts a flow of steam through the steam outlet conduit as compared to when the shaft is in an open position when the stop rests against the central opening; and
   a biasing mechanism for biasing the shaft in the open position.

2. The steam generator of claim 1 wherein the openings in the orifice plate are a plurality of holes that are symmetrically formed around the axis.

3. The steam generator of claim 2 wherein the openings are formed from two concentric series of holes that are evenly spaced around the axis.

4. The steam generator of claim 2 wherein the inlet end of the steam outlet conduit has a contour and the orifice plate has a complementary contour.

5. The steam generator of claim 1 wherein the axis extends in the vertical direction and the biasing mechanism is gravity.

6. The steam generator of claim 1 wherein the biasing mechanism is a spring supported between the support web and the orifice plate.

7. The steam generator of claim 6 wherein the spring is wound on the shaft.

8. The steam generator of claim 1 including a latch for supporting the orifice plate in the closed position.

9. The steam generator of claim 3 wherein the holes around the periphery in the orifice plate are blocked when the orifice plate is in the closed position.

10. The steam generator of claim 9 wherein the holes closest to the shaft are not blocked when the orifice plate is in the closed position.

\* \* \* \* \*